April 14, 1959

F. E. DAVIS III 2,882,454

MEANS FOR LOCKING A COVER ON A METER BOX

Filed Aug. 12, 1955

Inventor
Flavius E. Davis III
by Roberts, Cushman & Grover
Att'ys

United States Patent Office 2,882,454
Patented Apr. 14, 1959

2,882,454

MEANS FOR LOCKING A COVER ON A METER BOX

Flavius E. Davis III, Manchester, N.H., assignor to Anchor Manufacturing Company, Boston, Mass., a corporation of Massachusetts Application August 12, 1955, Serial No. 527,943

7 Claims. (Cl. 317—109)

In the meter box art it is customary to provide jaws in a meter box to receive blades projecting rearwardly from the base of a meter so that the meter may be attached in operative position merely by plugging the blades into the jaws. In this type of meter box it is also customary to leave the front of the box open and to provide a detachable cover for the open front, the cover having an opening through which the meter may be plugged in with the outer margin of the meter base seating on the cover around its opening.

Ordinarily the box cover is latched or fastened with screws in closed position and the meter is secured to the cover by means of a clamping ring surrounding the periphery of the meter base, the ring having an inner flange overlapping a flange around the cover opening and an outer flange overlapping the meter base. Heretofore it has been customary to locate the latch or screws in the meter opening so as to be covered and access to them prevented when the meter is inserted and sealed in position or else to provide two seals to prevent unauthorized access to the box, one to seal the cover latch in latched position and the other to seal the aforesaid ring in clamping position.

Objects of the invention are to eliminate either screws or the cover latch and one of the aforesaid seals, to accomplish the purpose of both seals with a single seal, to simplify the construction of the box cover, and to reduce the danger of short circuits in attaching and detaching the meter and cover from the box.

According to the present invention the box has an open front, the cover has a meter opening, the box has rearwardly facing abutments on opposite sides of the open front and the cover has parts engaging behind the aforesaid abutments by first inserting the cover edgewise to dispose one of the aforesaid parts behind one abutment, then swinging the cover inwardly until the other part is inside the plane of the other abutment and then moving the cover edgewise in the opposite direction to dispose the other part behind the other abutment in a closed position in which the parts are disposed behind the two abutments respectively, in combination with means to prevent movement of the cover from the aforesaid position after a meter is plugged into the jaws through the aforesaid opening. While the abutments may be on any two opposite sides of the front opening, preferably they are on the top and bottom sides, and the aforesaid parts of the cover are preferably the upper and lower margins of the cover. Preferably the abutments are in the form of flanges or lips on the box. In the preferred embodiment the means for locking the cover on the box comprises one or more insulation barriers fast to the meter base and projecting along the side of one or more of the aforesaid jaws for engagement with the jaws when the meter or cover is urged in the direction to move the cover from locked position toward unlocked position.

For the purpose of illustration a typical embodiment of the invention is shown in the accompanying drawings in which:

Fig. 4 is a front elevation of the box with the cover in locked position, the broken lines indicating the position occupied by the insulation barriers on the meter after the meter is plugged in.

Figure 1:
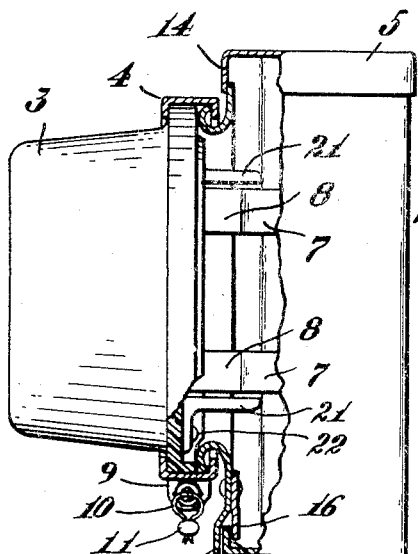
Fig. 1 is a side view with the meter in place and the side of the box broken away and the box cover and clamping ring in section.

The particular embodiment of the invention chosen for the purpose of illustration comprises a meter box 1 having an open front, a removable cover 2 for the open front, a meter 3 and a sealing ring 4 overlapping a flange around the meter opening in the cover. Telescoping over the upper end of the box is a cap 5 which is welded or otherwise fastened to the box. Mounted on the inside of the back of the box on insulators 6 are the usual meter jaws 7 to receive the usual meter blades 8 projecting rearwardly from the base of the meter. The ends of the sealing ring 4 have flanges 9 for securing the ends of the ring together with a bolt 10 and sealing the ring in clamping position with a seal 11 in the usual way. The jaws 7 are mounted on insulation bases 12 by means of screws as shown in Fig. 3.

Figure 2:
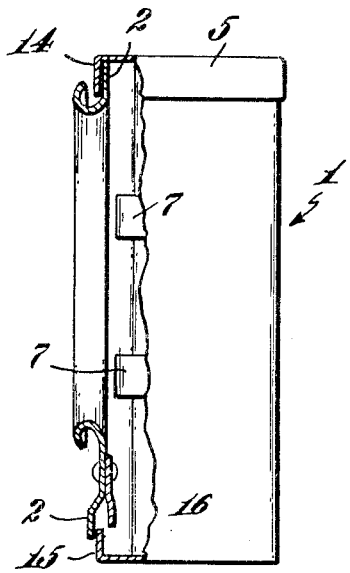
Fig. 2 is a similar view with the meter removed and the cover lifted to unlocked position.

At the top and bottom of the open front the box is provided with inturned flanges or lips 14 and 15. As shown in Fig. 1 the upper edge of the cover slips upwardly behind the lip 14 and the lower margin of the cover overlaps the outside of the lip 15. Fast to the inside of the bottom of the cover by means of rivets or by welding or other means is a plate 16 which overlaps the inside of the lip when the cover is in locked position. To remove the cover it is lifted to the position shown in Fig. 2 and the lower end is then swung outwardly to a position such as illustrated in Fig. 3, after which the cover may be slipped downwardly out of the box. As shown in the drawings the cover is provided with side flanges 17 which fit into recesses 18 on the sides of the box.

Figure 4:
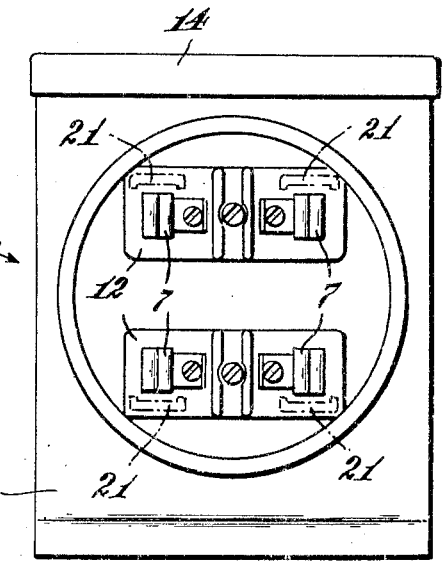

As shown in Fig. 1, L-shaped insulation barriers 21 are mounted on the meter base in any suitable way, as by means of screws 22, so as to project alongside the jaws 7 when the blades 8 are plugged into the jaws. In the illustration the two upper insulators are disposed immediately above the upper jaws and the lower insulators are disposed immediately below the lower jaws. Thus if the cover is lifted while the meter is plugged in, the lower insulators engage the lower jaws before the lower edge of the blade 16 clears the lip 15, and if the cover is moved downwardly the upper insulators engage the upper jaws before the upper edge of the cover clears the lip 14. Thus the cover cannot be removed while the meter is plugged in. Consequently the seal 11 which prevents unauthorized removal of the meter also seals the cover on the box. By shaping the insulation barriers as shown in Fig. 4 they serve to guide the meter blades into the jaws and to reduce the danger of short circuit in plugging the meter into the socket or withdrawing it from the socket.

Figure 3:
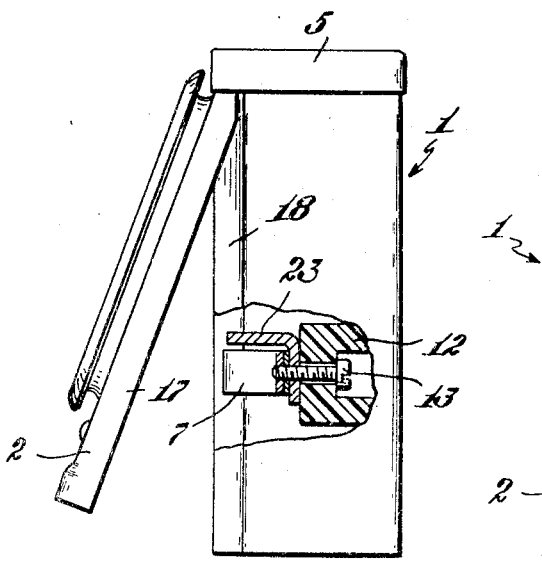
Fig. 3 is a side elevation of the box and cover with the cover swung outwardly to a position where it can be slipped edgewise out of the box, showing a modified form of barrier.

The modified barrier shown in Fig. 3 comprises an L-shaped member 23 which may be formed of metal or insulation, having one leg disposed between the jaw 7 and the insulation base 12 and the other leg overhanging the jaw. While such a barrier may be associated with each jaw, preferably they are provided only with the upper pair or the lower pair of jaws. If it be attempted to remove the cover while the meter is plugged in, the meter blades engage the barriers 23, and prevent the cover being lifted far enough to swing the lower end forwardly.

It should be understood that the present disclosure is for the purpose of illustration only and that this invention includes all modifications and equivalents which fall within the scope of the appended claims. For example, the lip 15 may be long enough to prevent the cover from being moved downwardly far enough for the upper edge of the cover to clear the lip 14, in which case the upper pairs of barriers 7 are not necessary for this purpose although they still serve the other aforesaid purposes.

I claim:

1. Apparatus of the character referred to comprising a meter box for housing jaws to receive meter blades, the box having an open front, a box cover for said front, the cover having a meter opening, the box having rearwardly facing abutments on opposite sides of said open front and the cover having parts engaging behind said abutments by first moving the cover edgewise in one direction to dispose one part behind one abutment, then swinging the cover inwardly until the other part is inside the plane of the other abutment, and then moving the cover edgewise in the opposite direction to dispose the other part behind the other abutment in a closed position in which the parts are disposed behind the two abutments respectively, both of said parts being fast to the cover and said one part overlapping its abutment more than the other part overlaps its abutment so that the one part continues to overlap after the cover is moved to closed position, and means to prevent movement of the cover from said position after a meter is plugged into said jaws through said opening.

2. Apparatus of the character referred to comprising a meter box for housing jaws to receive meter blades, the box having an open front, a box cover for said front, the cover having a meter opening, the box having inturned lips on opposite sides of said front and the cover having parts engaging behind said lips by first moving the cover edgewise in one direction to dispose one part behind one lip, then swinging the cover inwardly until the other part is inside the plane of the other lip, and then moving the cover edgewise in the opposite direction to dispose the other part behind the other lip in a closed position in which the parts are disposed behind the two lips respectively, both of said parts being fast to the cover and said one part overlapping its lip more than the other part overlaps its lip so that the one part continues to overlap after the cover is moved to closed position, and means to prevent movement of the cover from said position after a meter is plugged into said jaws through said opening.

3. Apparatus of the character referred to comprising a meter box containing meter jaws, a box cover having a meter opening, means for latching the cover to the box by edgewise movement of the cover relatively to the box transversely of the axis of the meter opening from an unlocked position to a locked position, a meter insertable through said opening with blades fitting into said jaws, and means to prevent movement of the cover from locked to unlocked position when the meter is inserted as aforesaid, said means comprising an insulation barrier fast to the meter and projecting along the side of one of said jaws for engagement with the jaw when the meter is urged from locked position toward unlocked position.

4. Apparatus of the character referred to comprising a meter box containing meter jaws to receive meter blades, a box cover having a meter opening to receive a meter, said box having rearwardly facing abutments on opposite sides of said opening and said cover having parts engaging behind said abutments by movement edgewise in one direction to dispose one part behind one abutment, then swinging the cover inwardly until the other part is inside the plane of the other abutment, and then moving the cover edgewise in the opposite direction to dispose the other part behind the other abutment in a closed position in which the parts are disposed behind the two abutments respectively, and stop means to prevent said movement in the first direction, said stop means being inaccessible after a meter is inserted, whereby the cover cannot be removed past said abutments without removing the meter.

5. Apparatus of the character referred to comprising a meter box containing meter jaws to receive meter blades, a box cover having an opening to receive a meter, said box having rearwardly facing abutments on opposite sides of said opening and said cover having parts engaging behind said abutments respectively in a locked position in which the cover cannot be removed from the box, the cover having edgewise movement transversely of the axis of the meter opening from said locked position to an unlocked position in which the cover is disengaged from one abutment so that it can be removed by swinging it around the other abutment, and stop means to prevent said movement, said stop means being inaccessible after a meter is inserted, whereby the cover cannot be removed past said abutments without removing the meter.

6. Apparatus of the character referred to comprising a meter box containing meter jaws to receive meter blades, a box cover having a meter opening to receive a meter, said box having upper and lower rearwardly facing abutments above and below said opening respectively and the upper and lower ends of said cover engaging behind said abutments by edgewise movement of the cover upwardly to dispose the upper end behind the upper abutment, then swinging the cover inwardly until the lower end is inside the plane of the lower abutment, and then moving the cover downwardly to dispose the lower end behind the lower abutment in a closed position in which the ends are disposed behind the two abutments respectively, and stop means to prevent said upward movement, said stop means being inaccessible after a meter is inserted, whereby the cover cannot be removed past said abutments without removing the meter.

7. Apparatus of the character referred to comprising a meter box containing meter jaws to receive meter blades, a box cover having an opening to receive a meter, said box having upper and lower rearwardly facing abutments above and below said opening respectively and the upper and lower ends of said cover engaging behind said abutments respectively in a locked position in which the cover cannot be removed from the box, the cover having upward movement from said locked position to an unlocked position in which the cover is disengaged from the lower abutment so that it can be removed, and stop means to prevent said movement, said stop means being inaccessible after a meter is inserted, whereby the cover cannot be removed past said abutments without removing the meter.

References Cited in the file of this patent

UNITED STATES PATENTS

| 2,128,277 | Young | Aug. 30, 1938 |
| 2,329,349 | Johansson | Sept. 14, 1943 |
| 2,359,628 | Daly | Oct. 3, 1944 |
| 2,363,345 | Macgahan | Nov. 21, 1944 |
| 2,651,008 | Johansson | Sept. 1, 1953 |
| 2,695,923 | Lajeunesse | Nov. 30, 1954 |